United States Patent Office 3,203,925
Patented Aug. 31, 1965

3,203,925
ORGANOSILICON COMPOUNDS CONTAINING PHOSPHORUS AND NITROGEN
Frank Fekete, Monroeville, Pa., assignor to Union Carbide Corporation, a corporation of New York
No Drawing. Filed July 25, 1960, Ser. No. 44,883
22 Claims. (Cl. 260—46.5)

This invention relates to novel organosilicon compounds which contain phosphorus and nitrogen.

The compounds of this invention include hydrocarbonoxysilanes and siloxanes containing two phosphinylidyne groups [i.e. groups having the formula $\equiv P(O)$], each of which is bonded to two hydrocarbonoxy groups and to the same nitrogen atom, which nitrogen atom is also bonded to a hydrocarbonoxysilyl or siloxysilyl group thru at least three carbon atoms of a divalent hydrocarbon group. Also included among the compounds of this invention are polymers produced by hydrolyzing and condensing the hydrocarbonoxysilane and siloxanes of this invention.

The hydrocarbonoxysilanes of this invention are represented by the formula:

$$\left[(RO)_2\overset{O}{\overset{\|}{P}}\right]_2 N-R''-\underset{|}{\overset{R_n}{Si}}(OR)_{3-n} \qquad (1)$$

wherein R is a monovalent hydrocarbon group, R'' is a divalent hydrocarbon group, n has a value from 0 to 2 inclusive, and the nitrogen atom is interconnected to the silicon atom through at least three carbon atoms.

Illustrative of the monovalent hydrocarbon groups represented by R in Formula 1 are the linear alkyl groups (for example the methyl, ethyl, propyl, butyl and stearyl groups), the cyclic alkyl groups (for example the cyclohexyl and cyclopentyl groups, the linear alkenyl groups (for example the vinyl and the allyl groups), the cyclic alkenyl groups (for example the cyclopentenyl and the cyclohexenyl groups), the aryl groups (for example the phenyl and naphthyl groups), the alkaryl groups (for example the tolyl group) and the aralkyl groups (for example the benzyl and beta-phenylethyl groups).

Illustrative of the divalent hydrocarbon groups represented by R'' in Formula 1 are the linear alkylene groups (for example the trimethylene, $-(CH_2)_3-$, and the octadecamethylene, $-(CH_2)_{18}-$ groups), the arylene groups (for example the naphthylene, $-C_{10}H_6-$ and para-phenylene, $-C_6H_4-$ groups); the cyclic alkylene groups (for example the cyclohexylene $-C_6H_{10}-$ group); the alkarylene groups (for example the tolylene, $CH_3C_6H_3-$ group) and the aralkylene group (for example the $-CH_2(C_6H_5)CHCH_2CH_2-$ group).

The preferred silanes of this invention are those represented by Formula 1 wherein R contains from 1 to 18 carbon atoms and wherein R'' contains at least 3 carbon atoms, and most preferably from 3 to 5 carbon atoms, interconnecting silicon and nitrogen but contains not more than 18 carbon atoms.

Illustrative of the silanes of this invention are:

$$\left[(C_6H_5CH_2O)_2\overset{O}{\overset{\|}{P}}\right]_2 NC_6H_4Si(CH_3)(OCH_3)_2$$

$$\left[(C_6H_{11}O)_2\overset{O}{\overset{\|}{P}}\right]_2 N(CH_2)_5Si(OC_2H_5)_3$$

$$\left[(C_2H_5O)_2\overset{O}{\overset{\|}{P}}\right]_2 N(CH_2)_3Si(OC_2H_5)_3$$

$$\left[(C_6H_5O)_2\overset{O}{\overset{\|}{P}}\right]_2 N(CH_2)_4\underset{|}{\overset{OC_2H_5}{Si}}(C_6H_5)_2$$

$$\left[\underset{CH_3O}{\overset{O}{\overset{\|}{C_6H_5CH_2OP}}}\right]_2 NC_6H_4CH_2CH_2\underset{|}{\overset{C_6H_5}{Si}}OC_2H_5$$

and $$\left[(CH_2=CHO)_2\overset{O}{\overset{\|}{P}}\right]_2 N(CH_2)_3Si(OCH_2C_6H_5)_3$$

The siloxanes of this invention contain a group represented by the formula:

$$\left[(RO)_2\overset{O}{\overset{\|}{P}}\right]_2 \underset{|}{\overset{R_n}{N-R''-Si}}O_{\frac{3-n}{2}} \qquad (2)$$

wherein R, R'' and n have the above-defined meanings and the nitrogen atom is interconnected to silicon through at least three carbon atoms.

Illustrative of the groups represented by Formula 2 are the groups having the formulae:

$$\left[(C_6H_5CH_2O)_2\overset{O}{\overset{\|}{P}}\right]_2 NC_6H_4\underset{|}{\overset{CH_3}{Si}}O$$

$$\left[(C_6H_{11}O)_2\overset{O}{\overset{\|}{P}}\right]_2 N(CH_2)_5SiO_{1.5}$$

$$\left[(C_2H_5O)_2\overset{O}{\overset{\|}{P}}\right]_2 N(CH_2)_3SiO_{1.5}$$

$$\left[(C_6H_5O)_2\overset{O}{\overset{\|}{P}}\right]_2 N(CH_2)_4\underset{|}{\overset{(C_6H_5)_2}{Si}}O_{0.5}$$

$$\left[\underset{CH_3O}{\overset{O}{\overset{\|}{C_6H_5CH_2OP}}}\right]_2 NC_6H_4CH_2CH_2\underset{|}{\overset{C_6H_5}{Si}}O_{0.5}$$

and $$\left[(CH_2=CHO)_2\overset{O}{\overset{\|}{P}}\right]_2 N(CH_2)_3SiO_{1.5}$$

The siloxanes of this invention include those siloxanes that are composed solely of groups represented by Formula 2 and also include those siloxanes that contain one or more groups represented by Formula 2 together with one or more groups represented by the formula:

$$R_xSiO_{\frac{4-x}{2}} \qquad (3)$$

wherein R has the above-defined meanings and x has a value from 0 to 3 inclusive.

Illustrative of the groups represented by Formula 3 are: the $SiO_2$, phenylsiloxy, methylsiloxy, dimethylsiloxy, methylethylsiloxy, trimethylsiloxy, diphenylsiloxy, vinyl(methyl)siloxy, divinylsiloxy, methyldiphenylsiloxy, and dicyclohexylsiloxy groups and the like.

The hydrocarbonoxysilanes and siloxanes of this invention are advantageously prepared by reacting a silicon compound (i.e. a hydrocarbonoxysilane or a siloxane) having an amino group interconnected to silicon through a divalent hydrocarbon group with a phosphorus compound composed of a phosphinylidyne group bonded to one halogen atom and to two monovalent hydrocarbon groups through oxygen (i.e. to two hydrocarbonoxy groups).

The reaction is represented by equation:

$$2(RO)_2\overset{O}{\overset{\|}{P}}-X + H_2N-R''-Si\equiv \longrightarrow$$

$$\left[(RO)_2\overset{O}{\overset{\|}{P}}\right]_2 N-R''-Si\equiv + 2HX \qquad (4)$$

wherein R'' and R'' have the above-defined meanings, X is a halogen atom (preferably chlorine or bromine), and the free valences of the silicon atom bonded the silicon atom (in the case of silanes) to at least one hydrocarbonoxy group or (in the case of siloxanes) to at least one siloxy group and any remaining free valences of the silicon atom bond the silicon atom to a monovalent hydrocarbon group.

The process is best carried out by forming a reaction mixture of the silicon compound used as a starting material and the phosphorus compound used as a starting material and maintaining the mixture at a temperature at which the desired reaction occurs while continuously removing from the reaction zone hydrogen halide [HX in Equation 4] as it is formed in the reaction.

The mole ratios of the phosphorus compound and the silicon compound employed in the reaction represented by Equation 4 is not narrowly critical. Stoichiometric amounts, i.e., the relative molar amounts indicated by Equation 4 are preferred for efficient reaction and ease of product recovery. For example, one gram atom of the nitrogen-bonded hydrogen of the silicon compound desired to be displaced is preferred for each gram atom of phosphorus-bonded halogen of the phosphorus compound.

The temperature at which the reaction represented by Equation 4 is conducted is not narrowly critical and can be varied in accordance with the speed of reaction desired. Temperatures of 20° C. to 300° C. are advantageous in providing a smooth reaction and high yields of products. Temperatures below 20° C. can be employed if desired but the reaction rate is slowed. Temperatures above 300° C. can also be employed but the likelihood of reduced yields is greater and the expense of operating at such high temperatures is undesirable. The process is advantageously carried out at atmospheric pressure or at whatever pressures exist in the particular reaction vessel employed without purposely applying increased or reduced pressures (i.e. autogenous pressure). Sub-atmospheric or super-atmospheric pressures can be employed, however, if desired.

No catalysts are required to effect the reaction represented by Equation 4 although suitable catalysts such as tetramethyl ammonium chloride, trimethyl benzyl ammonium chloride and the like can be employed for whatever advantage they may provide. Solvents also are not required but under certain conditions are useful in simplifying the handling of the reaction mixture or reducing the reaction time by providing a homogeneous reaction mixture if such is not otherwise obtainable. If a solvent is employed xylene, toluene, benzene, methylethyl ketone, dimethyl formamide, and the like can be used. A solvent which dissolves the starting materials and the products but does not dissolve hydrogen halides is particularly useful in removing the hydrogen halides from the reaction zone. Such solvents include toluene, benzene, xylene, dimethyl formamide, and the like.

The hydrogen halide (HX) formed in the reaction represented by Equation 4 is preferably continuously removed from the reaction zone by any suitable method of which many are known. A particularly suitable method is to add to the reaction mixture a hydrogen halide acceptor in the approximate stoichiometric amounts based on the amount of hydrogen halide expected to be formed in the reaction. Tertiary amines (e.g., triethyl amine, pyridine, tributyl amine, and the like) are some of the excellent hydrogen halide acceptors. Such tertiary amines form salts with the hydrogen halide which salts are insoluble in the reaction mixture. Excess amounts of the acceptors over and above the stoichiometric amount is preferably employed to ensure the substantially complete removal of the hydrogen halide. Alternately, the hydrogen halide can be continuously removed by heating the reaction mixture to cause the hydrogen halide to be evolved from the reaction mixture. Although it is not necessary in order to obtain a product, it is preferable, no matter what particular technique is employed in removing hydrogen halide, to maintain the pH of the system above a pH of about 6 and below a pH of about 8. It is preferable to maintain the pH above about 6 to prevent decreased yields due to possible side reactions involving the hydrogen halide formed in the process. It is preferable to maintain the pH below about 8 to prevent possible side reactions involving the silicon compound (e.g. reactions between the silicon compound and strongly basic hydrogen halide acceptors in the event moisture is also present).

The compounds of this invention can be isolated at the completion of the reaction represented by Equation 4 by any suitable conventional means. Thus the relatively low boiling compounds of this invention (i.e., in general, the hydrocarbonoxysilanes) can be isolated by filtration to remove insoluble salts and fractional distillation of the filtrate. The relatively high boiling compounds of this invention (i.e., in general, the siloxanes) can be isolated by stripping foreign material, extraction, filtering and/or recrystallization. One or more of the various conventional means can be employed to isolate the compounds of this invention.

The phosphorus compounds employed as starting materials in the above-described process for producing the compounds of this invention are represented by the formula:

$$(RO)_2PX \qquad (5)$$

wherein R and X are as previously defined. The preferred starting phosphorus compounds are those wherein R contains from 1 to 18 carbon atoms and X is chlorine or bromine.

Illustrative of the phosphorus compounds represented by Formula 5 are:

$(C_6H_5CH_2O)_2P(O)Cl$
$(C_6H_{11}O)_2P(O)Cl$
$(C_2H_5O)_2P(O)Cl$
$(C_6H_5O)_2P(O)Cl$
$(C_6H_5CH_2O)(CH_3O)P(O)Cl$ and $(CH_2=CHO)_2P(O)Br$ The silicon compounds employed as starting materials in the above-described process for producing the compounds of this invention include both hydrocarbonoxysilanes and siloxanes that contain an amino group interconnected to silicon through a divalent hydrocarbon group. The hydrocarbonoxysilanes used as starting materials in producing the hydrocarbonoxysilanes of this invention are represented by the formula:

$$H_2N-R''-\underset{\underset{\displaystyle |}{R_n}}{Si}(OR)_{3-n} \qquad (6)$$
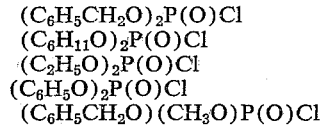

wherein R, R′, R″ and n have the above-defined meanings and the nitrogen atom is interconnected to silicon through at least three carbon atoms. Illustrative of these silanes are gamma-aminopropyltriethoxysilane, para-aminophenyl(methyl)dimethoxysilane, delta-aminobutyl(diphenyl)ethoxysilane, epsilon-aminopentyltriethoxysilane, delta-aminobutyltripropoxysilane, $H_2NC_6H_4CH_2CH_2Si(C_6H_5)(CH_3)(OC_2H_5)$

para-aminophenyl(methyl)diethoxysilane and the like.

The siloxanes that are used as starting materials in producing the siloxanes of this invention contain a group that is represented by the formula:

$$H_2N-R''-\underset{\underset{\displaystyle |}{R_n}}{Si}O_{\frac{3-n}{2}} \qquad (7)$$
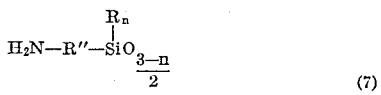

wherein R, R″ and n have the above-defined meanings and the nitrogen atom is interconnected to silicon through at least three carbon atoms. Illustrative of the groups represented by Formula 7 are the gamma-aminopropylsiloxy, para-aminophenyl(methyl)siloxy, delta - aminobutyl(diphenyl)siloxy, epsilon-aminopentylsiloxy, delta-aminobutylsiloxy, $H_2NC_6H_4CH_2CH_2Si(C_6H_5)(CH_3)O_{0.5}$ and para-aminophenyl(methyl)siloxy groups and the like.

Suitable starting siloxanes include both those siloxanes that are composed solely of groups represented by Formula 7 and those siloxanes that contain one or more groups represented by Formula 7 together with one or more groups represented by Formula 3.

The polymers of this invention that are produced by hydrolyzing and condensing the hydrocarbonoxysilanes and contain a group that is represented by the formula:

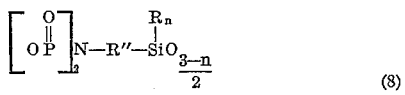

(8)

wherein R, R'' and $n$ have the above-defined meanings. In such groups the phosphorus atoms provide links in the polymeric chain.

The silicon atom in the group represented by Formula 8 can be linked through oxygen only to silicon or phosphorus or can be linked through oxygen to both silicon and phosphorus of another group or groups represented by Formula 8 to provide links in the polymeric chain. The phosphorus atoms in Formula 8 can be linked through oxygen only to silicon or phosphorus or can be linked through oxygen to both silicon and phosphorus of another group or groups represented by Formula 8 to provide links in the polymeric chain. Such polymeric chains can be cyclic or can be terminated by hydroxyl or hydrocarbonoxy groups linked to a silicon atom or to the phosphorus atom. Such polymeric chains can also be terminated by an $R_3SiO_{0.5}$ group linked to a silicon atom in the group represented by Formula 8.

When the phosphorus atoms in the group represented by Formula 8 is linked through oxygen to silicon atoms of other groups represented by Formula 8, the groups so linked can be depicted (in the case where $n$ is 2) by the formula:

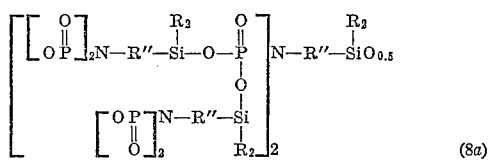

(8a)

wherein R and R'' have the above-defined meanings.

When the phosphorus atoms in the group represented by Formula 8 are linked through oxygen to the phosphorus atoms of other groups represented by Formula 8, the groups so linked can be depicted (in the case where $n$ is 2) by the formula:

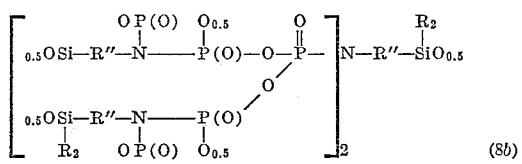

(8b)

wherein R and R'' have the above-defined meanings.

Illustrative of the polymers of this invention that contain a group represented by Formula 8 are the polymers that are produced by the hydrolysis and condensation of the silane:

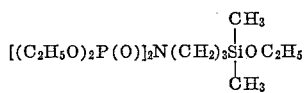

Such polymers are composed of groups having the formula:

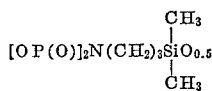

The hydrolysis and condensation reactions whereby are produced polymers containing groups represented by Formula 8 involve the reaction of a hydrocarbonoxysilane or a siloxane of this invention with water to hydrolyze the POR groups and, in the case of the silanes, the SiOR groups in the former compounds to form POH groups and SiOH groups which condense to form the polymer. The amount of water employed in the hydrolysis and condensation is at least one mole for each mole of Si—O—Si, Si—O—P and P—O—P linkages desired to be produced (i.e., one mole of water for each two moles of silicon-bonded and/or phosphorus-bonded hydrocarbonoxy group desired to be hydrolyzed to form silicon-bonded hydroxyl groups which condense with each other to form the Si—O—Si, Si—O—P or P—O—P linkages). A small excess of water over and above this amount is preferred for speed and ease of reaction. Of course, silicon-bonded and phosphorus-bonded hydrocarbonoxy groups can be present in the polymer, if desired, by incompletely hydrolyzing the silicon-bonded and phosphorus-bonded hydrocarbonoxy groups by using lesser amounts of water. Silicon-bonded and phosphorus-bonded hydroxyl groups can be present in the polymer if desired, by incompletely condensing the hydroxyl groups formed by hydrolysis. Such incomplete condensation is effected by using a large excess of water and short reaction times in the hydrolysis and condensation.

The hydrolysis and condensation reactions whereby are produced polymers containing groups represented by Formula 8 can be conducted at temperatures from 0° C. to 250° C. Temperatures in the range of about 50° C. to 150° C. are preferred in order to hasten the hydrolysis and condensation without thermal decomposition. A solvent is preferably employed to provide ease of handling the reaction mixture. Suitable solvents are the liquid hydrocarbons, (e.g., toluene, benzene, xylene and the like), alcohols (e.g., ethanol, iso-propanol and the like), and ethers (e.g., diisopropyl ether, diethyl ether and the like).

In producing polymers containing groups represented by Formula 8, it is desirable, particularly where the hydrocarbonoxy groups represented by OR are of relatively high molecular weight, to accelerate the rate of the hydrolysis and condensation reaction by employing a catalyst. By way of illustration, from about 0.5 to 3 percent by weight (based on the water reacted) of an inorganic acid (such as hydrochloric acid or sulfuric acid) can be used as a catalyst.

The polymers of this invention that contain groups represented by Formula 8, can be isolated after the hydrolysis and condensation by conventional means. Thus after the completion of the hydrolysis and condensation, low boiling materials such as water, alkanol by-products, solvents and the like can be removed from the reaction mixture by conventional means (e.g., distillation at reduced pressure) leaving the polymer as a residue.

It should be understood that polymers containing groups represented by Formula 8 are mixtures of compounds and from which can be separated (eg., by extraction of fractional crystallization) compounds containing only a particular type grouping (e.g. phosphorus combined only in P—O—P or only in P—O—Si linkages). The polymers of this invention that contain groups represented by formula 8 can also contain one or more groups represented by Formula 3. The latter groups are present in these polymers when silanes having the formula $R_xSi(OR)_{4-x}$ where R and $x$ have above-defined meanings are cohydrolyzed and cocondensed along with silanes of siloxanes of this invention in the production of the polymers. Alternately a group or groups represented by Formula 3 are present in the polymer if a starting siloxane of this invention is employed that contains a group or groups represented by Formula 3.

When siloxanes of this invention are employed in producing polymers containing groups represented by Formula 8, little or no Si—OR or SiOH groups may be initially present to react to form ≡Si—O—P linkages. However, ≡Si—O—Si≡ linkages in the siloxane can react with the water and alcohol (i.e. the alcohol formed by the hydrolysis of P—OR) to produce Si—OR and/or Si—OH. The presence of P—OH groups catalyzes such reactions of the normally stable Si—O—Si linkage.

The compounds of this invention are useful as lubricants or as additives to lubricants for improving the lubricity thereof. In particular they can be added to organopolysiloxane lubricating fluids for imparting improved lubricity thereto. The siloxanes containing groups represented by Formula 2 and the polymers containing groups represented by Formula 8 are also useful as flame and solvent resistant, protective coatings, particularly on metals such as steel, copper and aluminum. Such siloxanes and polymers can be formed in situ on the metal surface or can be pre-formed and then applied as a dilute solution to the metal surface. After drying and curing the coating protects the metal even under severely corrosive, wet and dry conditions.

The following examples illustrate the present invention:

*Example 1*

One-half mole (110.5 grams) of gamma-aminopropyltriethoxysilane and one mole (101 grams) of triethylamine were charged to a kettle fitted with a stirrer, condenser and dropping funnel. One mole (172.5 grams) of $(C_2H_5O)_2P(O)Cl$, was charged to the dropping funnel. The $(C_2H_5O)_2P(O)Cl$ was added slowly to the kettle over a period of about 20 minutes with stirring. The temperature rose from about 25° C. to 110° C. Triethylamine hydrochloride precipitated out immediately upon commencement of the addition. The reaction mixture was stirred for an additional 15 minutes after completion of addition and then was filtered through a Büchner funnel while hot. The filtrate was cooled to room temperature and filtered once more. The salt cake from both filtrations was washed with benzene to recover any filtrate retained by the cake. Benzene was evaporated from the washings and the liquid residue remaining was added to the filtrate. A total of about 130 grams of triethylamine hydrochloride was removed to filtration. The filtrate (233 grams) was analyzed by elemental analysis for carbon, hydrogen, phosphorus, silicon and nitrogen and by infra-red analysis. Analysis confirmed the filtrate having the formula: $[(C_2H_5O)_2P(O)]_2N(CH_2)_3Si(OEt)_3$. The product had an index of refraction, $n_D^{25}$, of 1.4303 and was obtained in a 95 percent yield.

|  | Elemental Analysis (wt.-percent) | | | | |
| --- | --- | --- | --- | --- | --- |
|  | C | Si | P | N | H |
| Theoretical | 41.20 | 5.68 | 12.60 | 2.80 | 8.50 |
| Found | 40.40 | 5.10 | 11.80 | 3.50 | 8.40 |

*Example 2*

Employing the procedure described in Example 1, one-half mole of para-aminophenyl(methyl)dimethoxysilane, benzene and one mole of triethylamine are charged to a kettle and one mole of $(C_6H_5CH_2)P(O)Cl$ is added thereto in a dropwise fashion over a period of about 30 minutes. Triethylamine hydrochloride precipitates out immediately upon commencement of the addition. The temperature is maintained below 150° C. during the addition. The reaction mixture is stirred for about 15 minutes and filtered while hot. The filtrate is cooled and refiltered. The filtrate thus obtained is stripped of benzene and the residue has the formula:

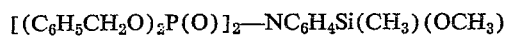
$[(C_6H_5CH_2O)_2P(O)]_2—NC_6H_4Si(CH_3)(OCH_3)$

This formula is confirmed by standard infra-red and elemental analysis and by cryoscopic molecular weight determinations.

*Example 3*

Employing the procedure described in Example 1, one-half mole of epsilon-aminopentyltriethoxysilane and one mole of triethylamine are charged to a kettle. One mole of $(C_6H_{11}O)_2P(O)Cl$ is added to the kettle in a dropwise fashion over a period of about 25 minutes, during which time the temperature rises but is kept below 150° C. by cooling. Triethylamine hydrochloride begins to precipitate immediately at the start of the addition. The reaction mixture is stirred for an additional 15 minutes and filtered while hot. The filtrate is cooled and refiltered. The filtrate thus obtained has the formula,

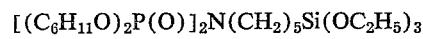
$[(C_6H_{11}O)_2P(O)]_2N(CH_2)_5Si(OC_2H_5)_3$

This formula is confirmed by standard infra-red and elemental analysis and by cryoscopic molecular weight determinations.

*Example 4*

When one mole of a siloxane having the formula:

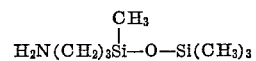

$$H_2N(CH_2)_3\underset{\underset{\displaystyle}{}}{\overset{\overset{\displaystyle CH_3}{|}}{Si}}—O—Si(CH_3)_3$$

two moles of $(C_4H_9O)_2P(O)Cl$ and two moles of triethylamine are dissolved in toluene and the solution is heated for 0.5 hour at 100° C. there is produced a solution which can be filtered and stripped of toluene to produce a siloxane of this invention having the formula:

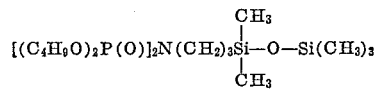

$$[(C_4H_9O)_2P(O)]_2N(CH_2)_3\underset{\underset{\displaystyle CH_3}{|}}{\overset{\overset{\displaystyle CH_3}{|}}{Si}}—O—Si(CH_3)_3$$

The formula of this compound can be confirmed by standard infra-red and elemental analysis and cryoscopic molecular weight determinations.

*Example 5*

When 3.0 moles of a silane of this invention that is represented by the formula:

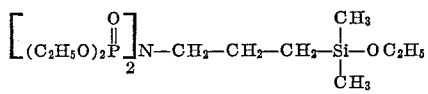

$$\left[(C_2H_5O)_2\overset{\overset{\displaystyle O}{\|}}{P}\right]_2 N—CH_2—CH_2—CH_2—\underset{\underset{\displaystyle CH_3}{|}}{\overset{\overset{\displaystyle CH_3}{|}}{Si}}—OC_2H_5$$

is dissolved in toluene and the solution so formed is mixed with 1.5 moles of water containing one percent by weight of hydrochloric acid and the mixture so formed is maintained at about 20° C. with stirring for about two hours, there is produced a polymer of this invention composed of groups having the formula:

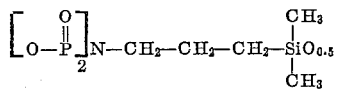

$$\left[O—\overset{\overset{\displaystyle O}{\|}}{P}\right]_2 N—CH_2—CH_2—CH_2—\underset{\underset{\displaystyle CH_3}{|}}{\overset{\overset{\displaystyle CH_3}{|}}{Si}}O_{0.5}$$

The polymer so formed can be isolated by separating the toluene, ethanol and any unreacted water therefrom by heating at 40° C. and 50 mm. of Hg pressure. The formula of this compound can be confirmed by standard infra-red and elemental analysis and cryoscopic molecular weight determinations.

*Example 6*

When five parts by weight of either a siloxane of this invention (e.g. the siloxane produced as described in Example 4) or a polymer of this invention (e.g. the polymer produced as described in Example 7) is dissolved in 100 parts by weight of toluene and the solution so formed is sprayed on a steel surface according to conventional coating techniques, there is produced, upon volatilization of the toluene, a coating on the steel surface which protects the steel surface from corrosion.

What is claimed is:

1. A hydrocarbonoxysilane represented by the formula:

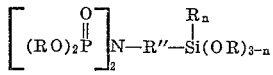

wherein R is a monovalent hydrocarbon group, R″ is a divalent hydrocarbon group, $n$ is an integer from 0 to 2 inclusive and the nitrogen atom is interconnected to silicon through at least three carbon atoms.

2. The hydrocarbonoxysilane of claim 1 wherein the group represented by R is a hydrocarbon group containing from 1 to 18 carbon atoms and R″ is an alkylene group containing from 3 to 5 carbon atoms.

3. The hydrocarbonoxysilane of claim 1 wherein R is an alkyl group and R″ is an alkylene group containing from 3 to 5 carbon atoms.

4. The hydrocarbonoxysilane of claim 1 wherein R″ is an alkylene group containing from 3 to 5 carbon atoms and $n$ is 0.

5. The hydrocarbonoxysilane of claim 1 wherein R″ is an alkylene group containing from 3 to 5 carbon atoms and $n$ is 1.

6. The hydrocarbonoxysilane of claim 1 wherein R″ is an alkylene group containing from 3 to 5 carbon atoms and $n$ is 2.

7. The hydrocarbonoxysilane represented by the formula:

$$[(C_2H_5O)_2P(O)]_2N(CH_2)_3Si(OC_2H_5)_3$$

8. The hydrocarbonoxysilane represented by the formula:

$$[(C_4H_9O)_2P(O)]_2N(CH_2)_3Si(OC_2H_5)_3$$

9. A siloxane comprising groups represented by the formula:

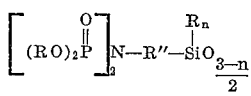

wherein R is a monovalent hydrocarbon group, R″ is a divalent hydrocarbon group, $n$ is an integer from 0 to 2 inclusive and the nitrogen atom is interconnected to silicon through at least three carbon atoms.

10. The siloxane of claim 9 wherein R is a hydrocarbon group containing from 1 to 18 carbon atoms and R″ is an alkylene group containing from 3 to 5 carbon atoms.

11. The siloxane of claim 9 wherein R″ is an alkylene group containing from 3 to 5 carbon atoms and $n$ is 0.

12. The siloxane of claim 9 wherein R″ is an alkylene group containing from 3 to 5 carbon atoms and $n$ is 1.

13. The siloxane of claim 9 wherein R″ is an alkylene group containing from 3 to 5 carbon atoms and $n$ is 2.

14. The siloxane of claim 9 wherein R is a methyl group.

15. A siloxane comprising (a) groups represented by the formula:

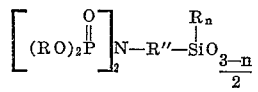

wherein R is a monovalent hydrocarbon group, R″ is a divalent hydrocarbon group, $n$ is an integer from 0 to 2 inclusive and the nitrogen atom is interconnected to silicon through at least three carbon atoms and (b) groups represented by the formula:

wherein R has the above-defined meaning and $x$ has a value from 0 to 2.

16. A polymer comprising polymeric units represented by the formula:

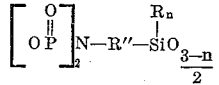

wherein R is a monovalent hydrocarbon group, R″ is a divalent hydrocarbon group, $n$ is an integer from 0 to 2 inclusive and the nitrogen atom is interconnected to silicon through at least three carbon atoms; each phosphorus atom and the silicon atom is bonded through oxygen to a member selected from the group consisting of phosphorus and silicon of another group represented by said formula.

17. The polymer of claim 16 wherein R is an alkyl group, R″ is an alkylene group containing from 3 to 5 carbon atoms and $n$ is 0.

18. The polymer of claim 16 wherein R is an alkyl group, R″ is an alkylene group containing from 3 to 5 carbon atoms and $n$ is 1.

19. A process for producing the polymer of claim 16 which process comprises hydrolyzing and condensing a hydrocarbonoxysilane represented by the formula:

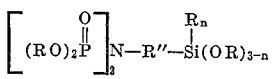

wherein R is a monovalent hydrocarbon group, R″ is a divalent hydrocarbon group, $n$ is an integer from 0 to 2 inclusive and the nitrogen atom is interconnected to silicon through at least three carbon atoms.

20. A process for producing the polymer of claim 16 which process comprises hydrolyzing and condensing a siloxane having the group represented by the formula:

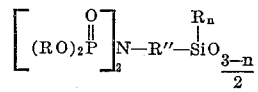

wherein R is a monovalent hydrocarbon group, R″ is a divalent hydrocarbon group, $n$ is an integer from 0 to 2 inclusive and the nitrogen atom is interconnected to silicon through at least three carbon atoms.

21. A process for producing a hydrocarbonoxysilane represented by the formula:

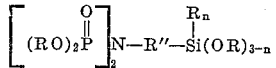

wherein R is a monovalent hydrocarbon group, R″ is a divalent hydrocarbon group, $n$ is an integer from 0 to 2 inclusive and the nitrogen atom is interconnected to silicon through at least three carbon atoms which comprises reacting:

(I) a phosphorus compound having the formula:

wherein X has a halogen atom and R has the above-defined meaning and (II) a silane having the formula:

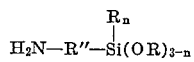

wherein R, R″ and $n$ have the above-defined meanings.

22. A process for producing a siloxane comprising groups represented by the formula:

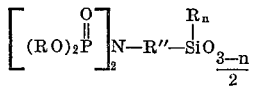

wherein R is a monovalent hydrocarbon group, R'' is a divalent hydrocarbon group, n is an integer from 0 to 2 inclusive and the nitrogen atom is interconnected to silicon through at least three carbon atoms which comprises reacting:

(I) a phosphorus compound having the formula:

wherein X has a halogen atom and R has the above-defined meanings and (II) a siloxane comprising groups having the formula:

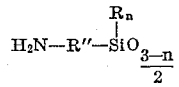

wherein R, R'' and $n$ have the above-defined meanings.

References Cited by the Examiner
UNITED STATES PATENTS

| | | | |
|---|---|---|---|
| 2,920,094 | 1/60 | Fekete | 260—448.2 |
| 2,934,550 | 4/60 | Jack | 260—448.2 |
| 2,951,860 | 9/60 | Plueddemann | 260—448.2 |
| 2,963,503 | 12/60 | Marsden | 260—46.5 |
| 2,978,471 | 4/61 | Fekete | 260—46.5 |

MURRAY TILLMAN, *Primary Examiner.*

MILTON STERMAN, HAROLD N. BURSTEIN, WILLIAM H. SHORT, *Examiners.*